Figure 1:
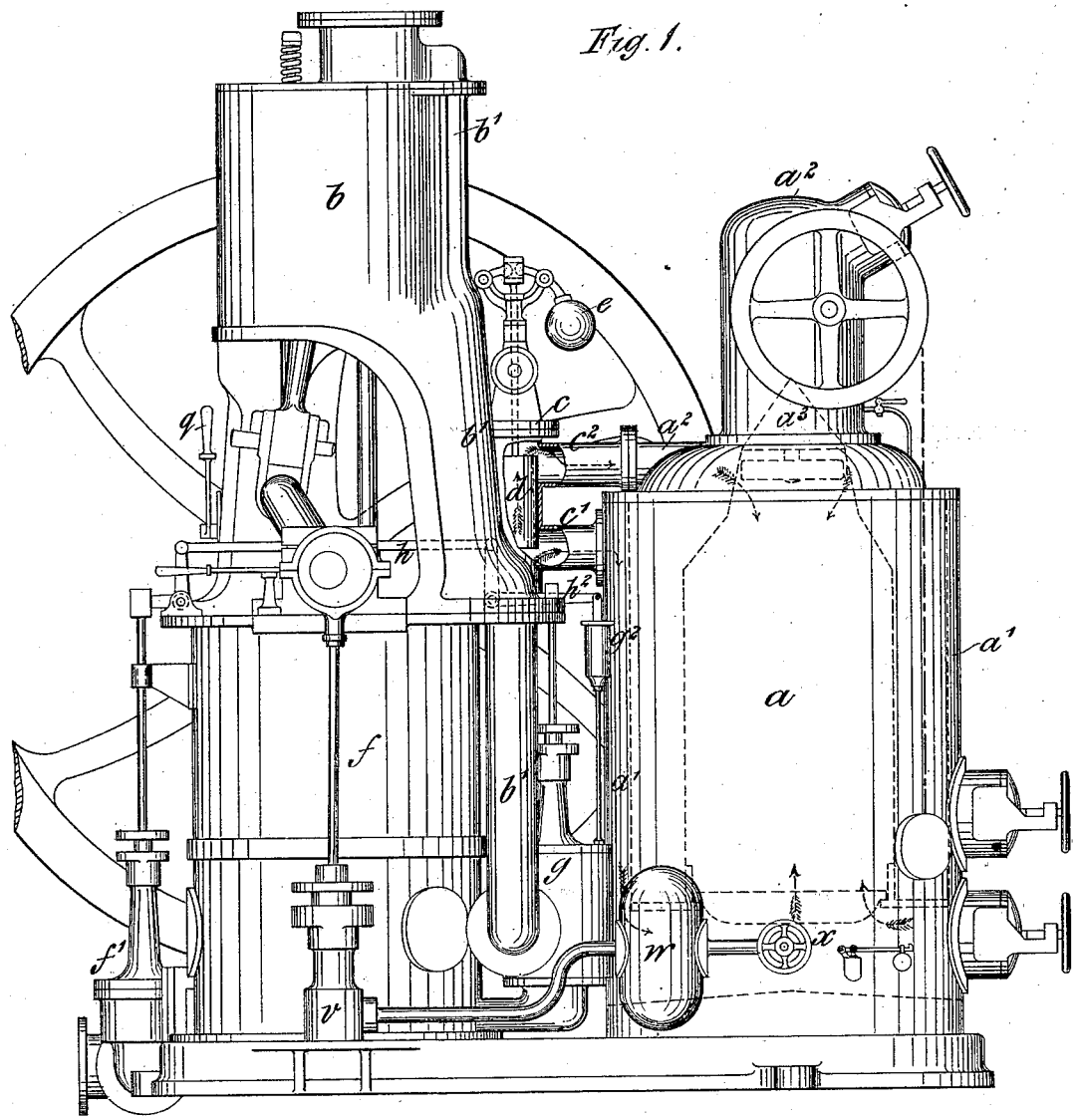

(No Model.)  
6 Sheets—Sheet 1.

J. BUCKETT.
CALORIC ENGINE.

No. 279,326. Patented June 12, 1883.

WITNESSES  
F. W. Howard  
W. C. Young

INVENTOR  
John Buckett  
by W. R. Doolittle  
Attorney (No Model.)

6 Sheets—Sheet 2.

J. BUCKETT.
CALORIC ENGINE.

No. 279,326. Patented June 12, 1883.

WITNESSES
F. W. Howard
W. C. Young.

INVENTOR
John Buckett
by M. H. Doolittle
Attorney (No Model.) 6 Sheets—Sheet 3.
J. BUCKETT.
CALORIC ENGINE.
No. 279,326. Patented June 12, 1883.

WITNESSES
F. W. Howard
W. C. Young.

INVENTOR
John Buckett,
by M. A. Doolittle
Attorney (No Model.) 6 Sheets—Sheet 4.
J. BUCKETT.
CALORIC ENGINE.
No. 279,326. Patented June 12, 1883.
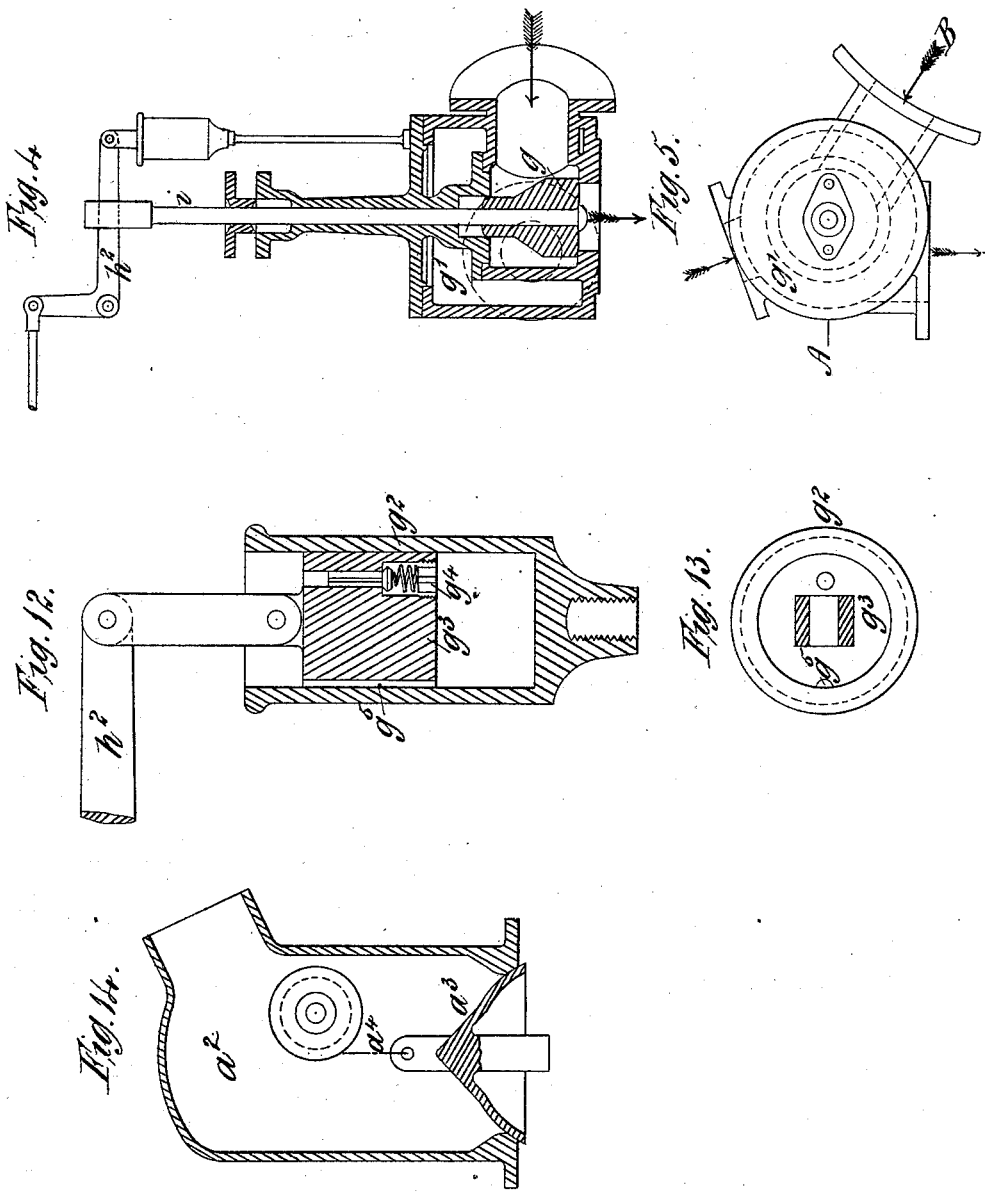
WITNESSES
F. W. Howard
W. C. Young.
INVENTOR
John Buckett
by W. H. Doolittle
Attorney

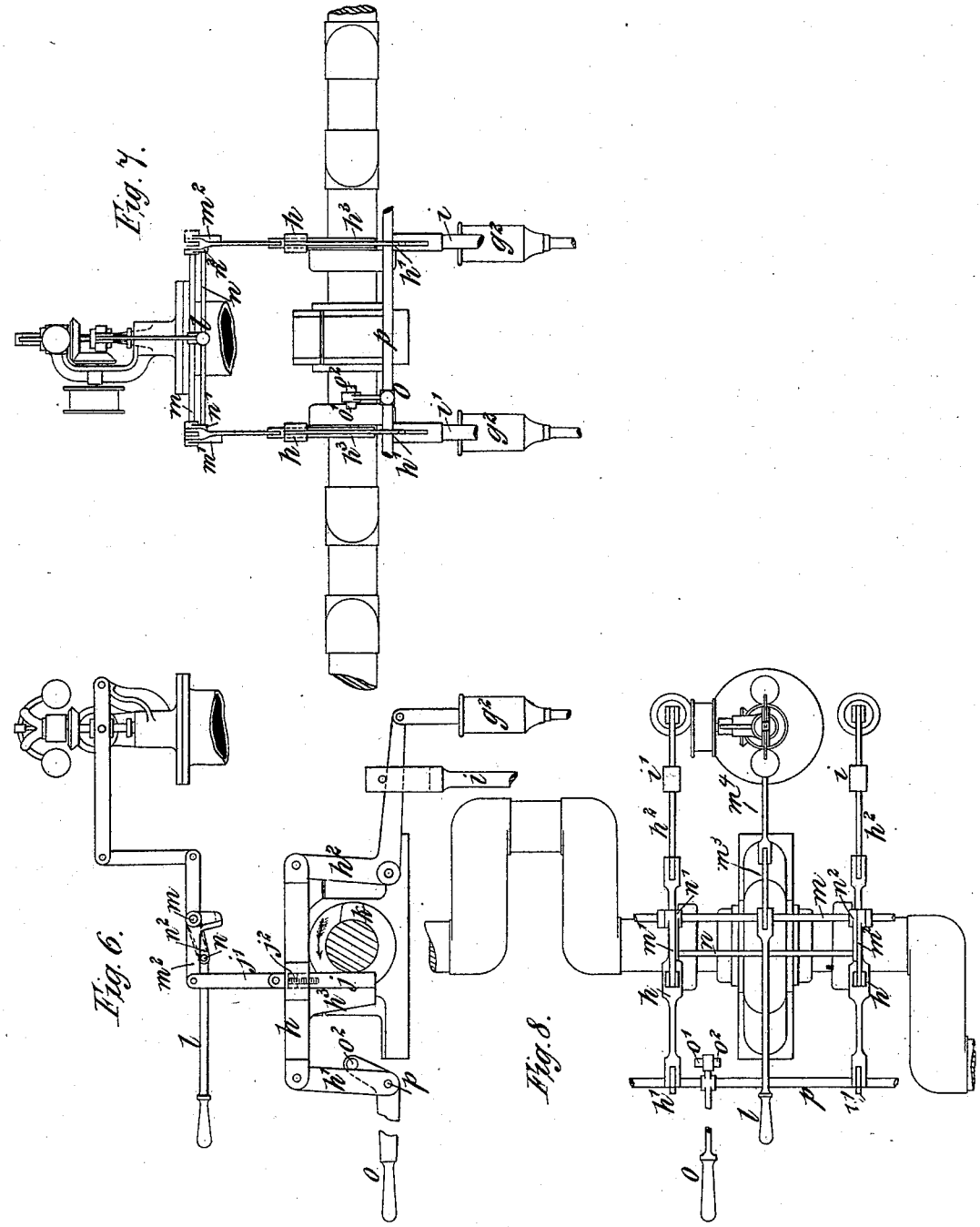

(No Model.)
J. BUCKETT.
CALORIC ENGINE.
No. 279,326.
6 Sheets—Sheet 6.
Patented June 12, 1883.
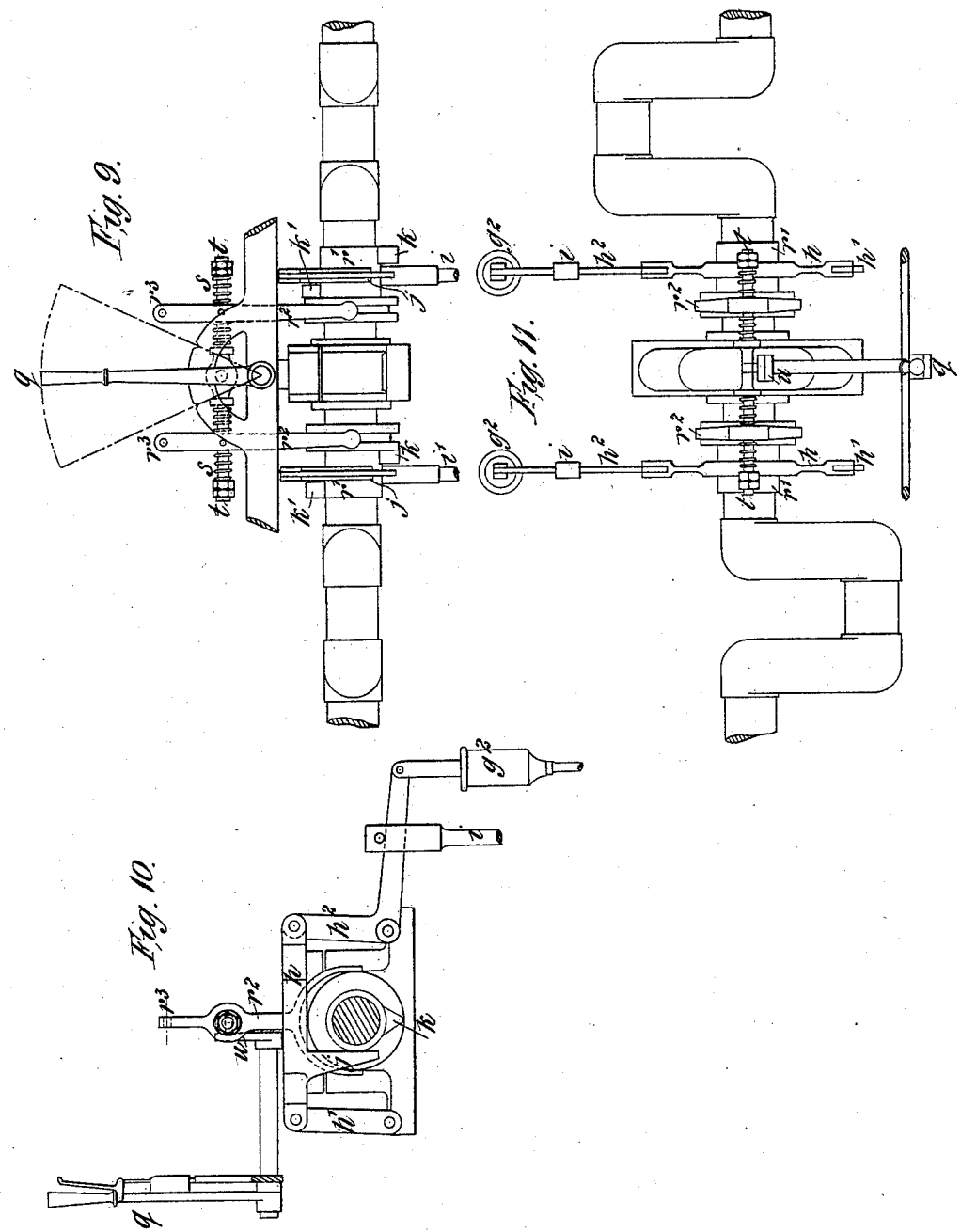

UNITED STATES PATENT OFFICE.

JOHN BUCKETT, OF SOUTHWARK, COUNTY OF SURREY, ENGLAND.

CALORIC-ENGINE.

SPECIFICATION forming part of Letters Patent No. 279,326, dated June 12, 1883.

Application filed July 19, 1882. (No model.) Patented in England May 2, 1882, No. 2,075; in Canada August 14, 1882, No. 15,313; in France September 1, 1882, No. 150,901; in Belgium September 4, 1882, No. 58,934; in Italy September 30, 1882, XVI, 14,586, XXIX, 122, and in Spain February 3, 1883, No. 3,531.

*To all whom it may concern:*

Be it known that I, JOHN BUCKETT, a subject of the Queen of Great Britain and Ireland, residing at Southwark, in the county of Surrey, Kingdom of Great Britain and Ireland, have invented new and useful Improvements in Caloric-Engines, of which the following is a specification.

My invention has reference to caloric-engines of the kind wherein the air which is delivered by the air-pump is divided into two streams before entering the retort. One stream is delivered to an annular space between the firebrick lining of the retort and the outer casing, whence it descends beneath the grate-bars and passes through the fire. During this passage its oxygen enters into combination with the fuel and effects combustion, forming carbonic acid, which, in passing through the upper stratum of the fuel, takes up carbon and becomes converted into carbonic oxide, so that the space above the fire constitutes a combustion-chamber containing carbonic oxide and nitrogen. The other stream is delivered into the combustion-chamber, where it meets with the carbonic oxide and nitrogen, and instantaneous combustion of the latter results. An intense heat and great pressure are thus produced, which pressure is subsequently used to operate the working-piston of the engine, to and from which it is alternately admitted and cut off at the proper times by a valve or valves.

In such engines as heretofore constructed, when the hot air, on its way from the retort to the working-cylinder, is suddenly stopped by the closing of the valve, there results an accession of heat, the action of which upon the valve is such as to necessitate the working of the engine at a comparatively slow speed. To obviate this, I form around and about the valve and its seating a space or chamber, into and through which atmospheric air is caused to pass on its way from the pump to the retort, so as to take up and utilize a portion of the heat above referred to and prevent excessive heating of the valve. The air chamber or space surrounding the valve and its seating forms practically an intermediate part of the air-feeding pipe or conduit, so that at each stroke of the engine the pump delivers a stream of cold air into it for the purpose mentioned.

To enable admission of hot air from the retort to the working-cylinder to be automatically regulated and cut off by the action of a governor, I apply to the valve-motion a sliding or moving piece arranged to be adjusted by the governor in accordance with the speed of the engine. According to the position of the sliding or moving piece, the valve is closed at an earlier or a later point of the stroke. In connection with the said sliding piece I provide means for regulating the cutting off of the supply of heated air to the working-cylinder, so that this may be effected at the desired point in the stroke of the piston.

To effect stopping and reversing of the engine, I provide cams or tappets so arranged as to engage with sliding or pivoted bars connected to the inlet and outlet valves of the engine. Each cam or tappet is made double, and is so arranged that one of its parts is set to correspond to the forward motion of the engine and one to the backward motion. These two parts can never engage with the rod connected to the corresponding valve at the same time, although they may both be clear of it. By moving the cam or tappet in one direction the forward-motion part comes into action, while by moving it in the other direction the backward-motion part is put into action. In the intermediate position the engine is at rest.

To obviate or lessen the noise occurring on the closing of the valves, I provide a cylinder wherein elastic fluid—such as air—is compressed just as the valve is closing. This cylinder is furnished with a plunger connected with the valve-motion in such a manner that when the valve is about to close the fluid in the said cylinder offers the necessary resistance just before the actual closing of the valve, thus preventing the valve from forcibly striking its seating.

To obviate liability of hot gases escaping from the retort into the fuel-chamber, if the fuel-feeding valve should be imperfectly closed, owing to its not being brought truly to its seat, I form the said valve of a combined conical and partially-spherical form, such that while the upper part will afford facilities for distributing the fuel upon the fire and preventing the accumulation of dust or pieces of fuel likely to interfere with its closing, the lower or spherical part, fitting closely against its seating, will prevent escape of hot gases, notwithstanding that the valve-axis may not be truly coincident with the axis of the seating.

When the engine exceeds its normal speed the governor operates the valve-connections, so that the heated air shall be cut off from the working-cylinder at an earlier point of the piston's stroke.

To operate the valve-connections, I provide levers or bars so arranged that the governor, as it is influenced by change of speed, will raise or draw a sliding piece more or less away from the cam used for operating the valve, by which means the inlet-valve is made to close sooner or later, and so admit the heated air to the cylinder for a shorter or longer time, according to the power required.

When the engine is being stopped it is advantageous that a reserve of pressure should be accumulated, as the gases in the retort lose part of their heat when the fire is not urged by the pump, and restarting is a matter of difficulty. To this end I arrange the stopping device in such wise that when operated it closes communication between the retort and the working-cylinder, but allows the air-pump to keep in action so long as the momentum left in the engine is sufficient to overcome the pressure required to force the air into the retort.

When my improved engine is applied to work which is unequal—such as propelling tram or traction engines, driving power-cranes, winding apparatus, and the like—I provide an additional air receiver or vessel, which is charged with compressed air, either by the action of the engine-pump or by an additional pump provided for that purpose. Thus, when the engine is not required to develop its full amount of work, its surplus force can be used to create reserved pressure, and the force so stored can be used when extra work has to be performed by the engine.

Figure 2:
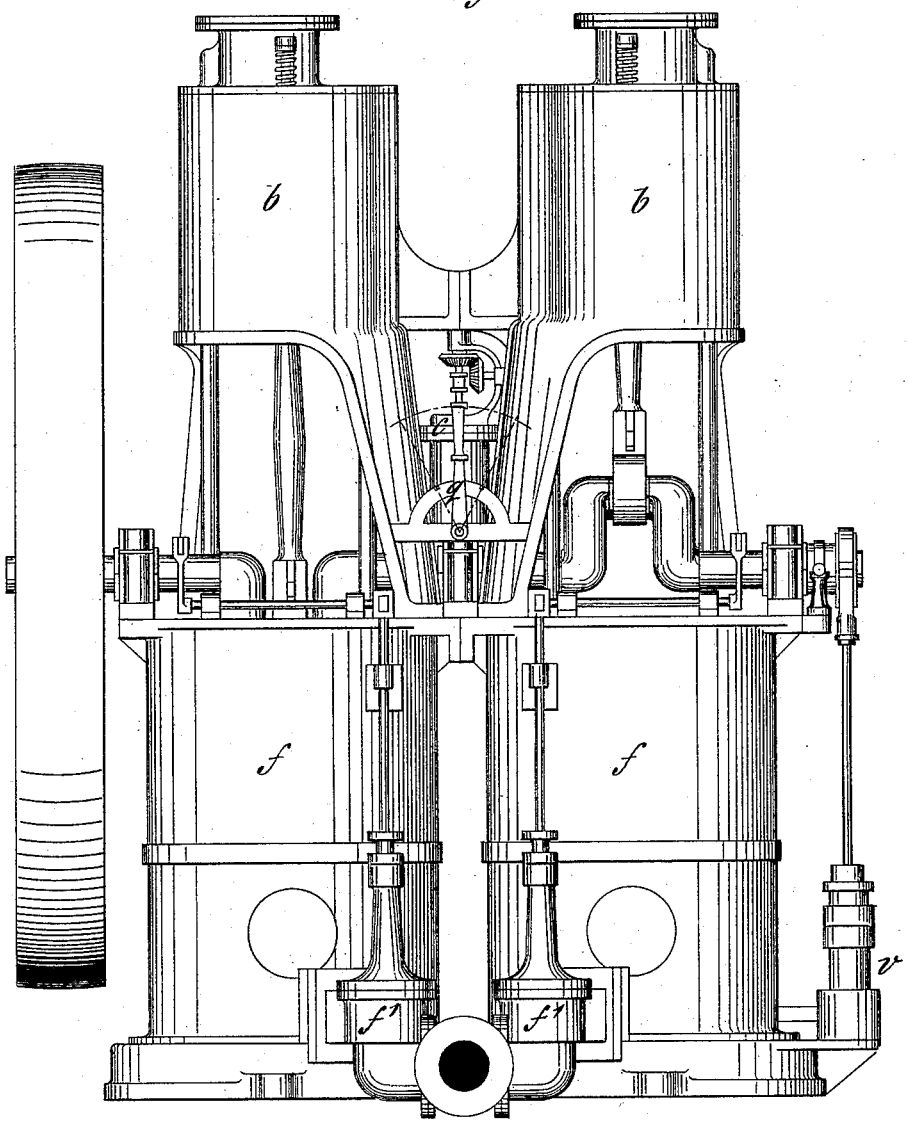
Figure 3:
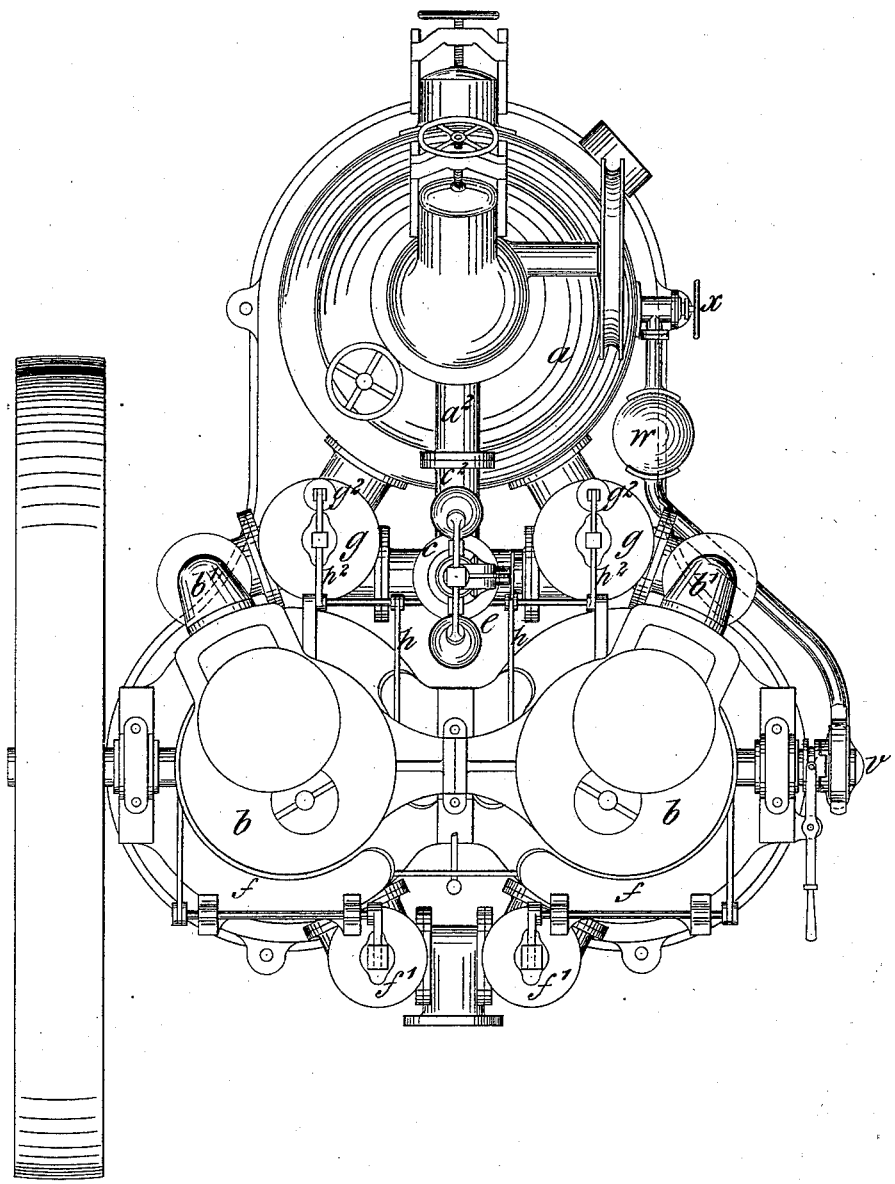

In the annexed drawings, Figure 1 is a side elevation of my improved caloric-engine. Fig. 2 is an elevation at right angles to Fig. 1, and Fig. 3 is a plan.

$a$ is the retort, formed of fire-brick, and surrounded by an annular air-space, $a'$, into which a portion of the air from the air-pumps $b\ b$ is delivered by means of the pipes $b'\ b'$ and the central pipe, $c$. The pipe $c$ has two branches, $c'\ c^2$, leading, respectively, to the annular space $a'$ and to the top $a^2$ of the retort $a$, the proportion of air passing through each branch being regulated by the hollow cylindrical valve $d$, operated by the governor $e$, as shown in Fig. 1. The air which passes through $c'$ and around the air-space $a'$ descends to beneath the fireplace of the retort and passes through the fuel. The air that is delivered through the branch $c^2$ is conducted to the upper part of the retort, where it enters into combination with the carbonic oxide, as already explained. The heated high-pressure gas is admitted from the retort to the working-cylinders $f\ f$ by the valves $g\ g$, operated from the crank-shaft, and escapes by means of the exhaust-valves $f'\ f'$, operated in a similar manner to the valves $g\ g$. The hollow cylindrical valve $d$ is so arranged with respect to the branches $c'\ c^2$ that when the engine slackens speed and the governor falls the said valve is raised, thus allowing a greater proportion of the air to pass through $c'$ into the air-space $a'$ and up through the incandescent fuel, at the same time allowing a smaller proportion of air to pass through $c^2$ to the combustion-chamber. Thus the consumption of fuel is regulated in proportion to the amount of power given out by the engine. As the atmospheric air from the pumps $b\ b$ is forced through the pipes $b'\ b'$ and $c$ to the retort $a$ it is caused to pass through a space or chamber, $g'$, (shown in section, Fig. 4, and in plan, Fig. 5,) formed around and about each of the valves $g$, so as to take up and utilize a portion of the heat evolved by the hot air (on its way to the cylinders $f\ f$) being suddenly stopped by the closing of the said valves. In the figures the course of the heated air is shown by thick arrows and the course of the cool air by thin arrows. Excessive heating of the said valves $g\ g$ is by the just-described arrangement prevented.

Fig. 6 is a side elevation, Fig. 7 an end elevation, and Fig. 8 a plan, of the valve-motion, by which the admission of hot air from the retort to the working-cylinders $f\ f$ is automatically regulated and cut off by the action of the governor. There is a separate arrangement for each cylinder, both being controlled by the same governor. As the two arrangements are identical, the same description will apply to each.

$h$ is a bar, pivoted at one end to the link $h'$, and at the other end to the lever $h^2$, which operates the valve-spindle $i$. In the bar $h$ there slides a moving piece, $j$, connected by levers and links to the governor and bearing against a supporting-piece, $h^3$, on the bar $h$. The sliding piece $j$ is connected to the link $j'$ by a screw-connection, $j^2$, for adjusting its length. By this device the point of maximum of cut-off can be regulated. As the crank-shaft revolves in the direction of the arrow it carries round with it the cam or tappet $k$, which, coming against the sliding piece $j$, moves the bar $h$ and operates the valve-spindle $i$. If the speed of the engine be increased, the governor lifts the sliding piece $j$, so that the cam or tappet $k$ leaves it sooner and allows the valve-spindle $i$ to descend and the inlet-valve to close and cut off the flow of hot air to the cylinder at an earlier point of the stroke.

The handle $l$ is provided for the purpose of stopping the engine. It is pivoted loosely on the shaft or spindle $m$, and when lifted it raises both pieces $j$ clear of the cam or tappets $k$ by means of the bar or spindle $n$. This spindle rests upon the lever $l$, and is carried in two arms, $n'\ n^2$, pivoted loosely on the shaft $m$. It projects at each end underneath the arms $m'\ m^2$ in such a way that when raised it also raises the said arms, and with them the sliding piece $j$. The lever $m^3$ is keyed on the rock-shaft $m$, and moves it in accordance with the rise and fall of the governor-arms. The levers $m^4$ are also keyed to the same shaft, and transmit its motion to the levers $m'$ $m^2$, which are connected by the links $j'$ $j'$ to the sliding pieces $j$ $j$. The effect of this arrangement is that when it is desired to raise the sliding pieces by the hand-lever this can be done without any alteration in position of the governor-balls, since the levers $m'$ $m^2$ are free to be moved away from the levers $m^4$.

In order to start the engine it is necessary to open the inlet-valve of one of the cylinders, and for this purpose the hand-lever $o$ is provided. It works loosely on the shaft $p$, and is capable of being slid along it, so that it can be made to actuate either valve-rod $i$ or $i'$ through the link or lever $h'$, sliding bar $h$ and lever $h^2$, and one of the projecting pieces $o'$ $o^2$.

The reversing arrangement is shown separately for the sake of clearness in front elevation in Fig. 9, in end elevation in Fig. 10, and in plan in Fig. 11. In these figures the governor and the mechanism for effecting the automatic cut-off are omitted. The cams or tappets $k$ $k$ are carried by sliding pieces $r'$ on the crank-shaft. Each sliding piece is connected to the shaft by a feather-key, and is provided with a groove into which two clutch-fingers, forming part of a clutch-lever, $r^2$, project. The clutch-levers are connected to the handle $q$, and if the handle be moved out of its mid-position the sliding pieces $r'$ are carried along the shaft in the same direction, so that one set of their tappets, $k$ $k$, come into gear with the pieces $j$ on the bars or levers $h$, thus operating the valve-spindles $i$ $i'$ at such times that the engine is caused to turn in one direction. If the handle $q$ be moved in the other direction, the sliding pieces will be moved so that the other set of tappets, $k'$ $k'$, are brought into gear with the piece $j$.

In order that the clutch-levers $r^2$ may be operated by one handle, $q$, and at the same time be allowed to give in case the tappets $k$ do not both at the same time, through different positions of the said cams, engage with the pieces $j$, the clutch-levers $r^2$ are connected to the shaft $t$ by means of collars carried loosely on the said shaft, against which the springs $s$ $s$ bear, and which are pivoted to the forked levers $r^2$.

To obviate or lessen the noise occurring on the closing of the valves $g$, a cylinder, $g^2$, (shown in section, Fig. 12, and in plan, Fig. 13,) fixed to the valve-casing, is fitted with a plunger, $g^3$, connected to the rocking lever $h^2$, which works the valve-spindle $i$. In the plunger $g^3$ is a valve, $g^4$, opening inward, so that as the plunger rises when the valve $g$ is opened air rushes in beneath the plunger. As the rocking lever $h^2$ is depressed so as to close the valve $g$, it also forces down the plunger $g^3$, thus compressing the air beneath it, which escapes up the aperture $g^5$. This air acts as a cushion and offers the necessary resistance just before the actual closing of the valve $g$, thus preventing it from forcibly striking its seating. The amount of resistance offered by the air to the plunger may be varied by increasing or diminishing the size of the escape-aperture $g^5$. This form of valve mechanism I do not, however, claim in the present application.

$a^2$, Fig. 1, is a fuel-chamber fixed to the top of the retort $a$, whereby fuel is fed to the retort by means of a valve, $a^3$. (Shown in section in Fig. 14.) To insure the tight fitting or closing of this valve against its seating, so as to prevent the escape of hot air from the retort into the fuel-chamber, owing to the supporting-chain $a^4$ not being at all times perfectly central, and so canting the valve, the said valve is formed of a combined conical and partially-spherical shape, such that while the upper or conical part affords the facilities for distributing the fuel upon the fire and preventing the accumulation of dust or pieces of fuel, likely to interfere with its closing, the lower or spherical part prevents the escape of hot air, as before mentioned. On stopping the engine its momentum can be expended in forcing air from the pump into the retort or into a separate receiver; or a separate pump, $v$, Fig. 1, may be worked from the crank-shaft and force air into a receiver, $w$, connected by a valve, $x$, to the retort. The accumulated pressure of the air in the receiver $w$ may be directed into the fire-place of the retort on again starting the engine, or direct to the cylinder. In the case of tramway-engines and the like the resistance offered by the pump in accumulating the said pressure may act as a brake to stop the vehicle.

What I claim is—

1. The air-inlet valve surrounded by the air passage or chamber, whereby the excessive heating of the said valve is prevented, substantially as described.

2. In a caloric-engine, the combination of a sliding or movable piece, an adjustable link, and a revolving cam or tappet, for the purpose of fixing or adjusting the point of maximum or latest cut-off of the motive fluid to the working-cylinder, substantially as described.

3. In a caloric-engine, the combination of a sliding or movable piece, normally subject to the action of a cam or tappet, for the purpose of operating the inlet-valve of the cylinder, and mechanism whereby the said piece may be withdrawn from the action of the said cam or tappet to stop the engine, substantially as described.

4. In a caloric-engine, the combination of a sliding or movable piece, $j$, a cam or tappet, $k$, a link, $j'$, a bar, $n$, a shaft, $m$, and a handle, $l$, substantially as and for the purposes described.

5. In a caloric-engine, the combination of a movable piece and two cams or tappets carried on one sliding piece, one of the said cams or tappets being arranged in the right position for the forward motion of the engine and one in the right position for the backward motion of the engine, and the whole being so arranged that either of the said cams or tappets can be set so as to act upon the movable piece, or that both can be set clear of it, substantially as described.

6. In a caloric-engine, the combination of two cams or tappets, $k\ k'$, set one for forward motion and one for backward motion, sliding piece $j'$, carrying said tappets, movable piece $j$, clutch-lever $r^2$, and handle $q$, substantially as described.

7. In a caloric-engine, the combination of a cam or tappet, a sliding or movable piece, a lever operated by the motion of the said piece, an air-inlet valve controlling the flow of fluid to the working-cylinder, and an air-cushion for modifying the closing of the valve, substantially as described.

8. The combination of the retort $a$, provided with a top, $a^2$, the central pipe, $c$, and branch pipes $c'$ and $c^2$, the valve $d$, and the governor, substantially as described.

9. In a caloric-engine, a receiver into which air is delivered by a pump at such times as the full power of the engine is not required to be exerted on the external work, or when the engine is driven by its own momentum or by an external force, substantially as described.

10. In a caloric-engine, the combination of a retort, an air-inlet valve surrounded by an air-passage for the circulation of cold air, and operated by a sliding or movable piece under the action of a cam or tappet, its closing being retarded or modified by an air-cushion, a working cylinder or cylinders, and a pump, substantially as described.

JOHN BUCKETT.

Witnesses:
 F. J. BROUGHAM,
 J. G. STOKES,
  Both of 7 Whitehall Place, London.